US007764970B2

United States Patent
Neil et al.

(10) Patent No.: US 7,764,970 B2
(45) Date of Patent: Jul. 27, 2010

(54) LIMITED LIFESPAN FOR OUTGOING DATA AT A MOBILE DEVICE

(75) Inventors: Tim Neil, Mississauga (CA); Paul Chalmers, Windsor (CA)

(73) Assignee: Research in Motion Limited, Waterloo, Ontario (CA)

( * ) Notice: Subject to any disclaimer, the term of this patent is extended or adjusted under 35 U.S.C. 154(b) by 0 days.

(21) Appl. No.: 12/622,908

(22) Filed: Nov. 20, 2009

(65) Prior Publication Data

US 2010/0069104 A1   Mar. 18, 2010

Related U.S. Application Data

(63) Continuation of application No. 11/460,744, filed on Jul. 28, 2006, now Pat. No. 7,623,877.

(51) Int. Cl.
*H04Q 7/20* (2006.01)
(52) U.S. Cl. ............ 455/466; 455/412.1; 455/412.2; 709/206; 709/207
(58) Field of Classification Search ......... 455/412.1–2, 455/418–420, 414.1, 456.1, 466, 512; 709/206, 709/207, 224, 227
See application file for complete search history.

(56) References Cited

U.S. PATENT DOCUMENTS

| | | | |
|---|---|---|---|
| 6,597,920 B2 * | 7/2003 | Yegani et al. ............... 455/512 |
| 7,236,791 B2 * | 6/2007 | Chambers et al. ........... 455/450 |
| 7,295,854 B2 | 11/2007 | Haumont et al. |
| 7,295,862 B2 * | 11/2007 | Laitinen et al. ............. 455/566 |
| 7,496,631 B2 | 2/2009 | Austin-Lane et al. |
| 2002/0107580 A1 | 8/2002 | Hulai et al. |
| 2003/0060896 A9 | 3/2003 | Hulai et al. |
| 2004/0248598 A1 * | 12/2004 | Ding et al. .................. 455/466 |
| 2005/0249118 A1 | 11/2005 | Terry et al. |
| 2007/0190978 A1 * | 8/2007 | White et al. ............. 455/412.1 |

FOREIGN PATENT DOCUMENTS

| | | |
|---|---|---|
| EP | 0860776 | 8/1998 |
| GB | 2329986 | 7/1999 |

OTHER PUBLICATIONS

Congvan Tran, USPTO Office Communication dated Jul. 10, 2009 in relation to U.S. Appl. No. 11/460,744, filed Jul. 28, 2006.
Congvan Tran, USPTO Office Communication dated Mar. 5, 2009 in relation to U.S. Appl. No. 11/460,744, filed Jul. 28, 2006.
European Patent Office Communication dated Oct. 18, 2006 in relation to Application No. 06118046.9.

* cited by examiner

*Primary Examiner*—CongVan Tran

(57) ABSTRACT

An outgoing message may be generated, at a mobile communication device, based on a received application definition document, which indicates a lifespan for the message. In conjunction with generating a message in accordance with a format provided in the application definition document, a message expiry time may be generated. The message may be stored in a queue for transmission. Additionally, an indication of the expiry time may be stored in the queue in association with the message. The expiry time of the message may periodically be compared to the current time to determine whether the message has expired. Upon expiry, a user of the mobile communication device may be presented with the option to cancel transmission of the message or re-attempt transmission.

20 Claims, 5 Drawing Sheets

US 7,764,970 B2

LIMITED LIFESPAN FOR OUTGOING DATA AT A MOBILE DEVICE

CROSS-REFERENCE TO RELATED APPLICATION

This application is a continuation of application Ser. No. 11/460,744 filed Jul. 28, 2006, now U.S. Pat. No. 7,623,877, the contents of which are hereby incorporated by reference.

COPYRIGHT NOTICE

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

FIELD OF TECHNOLOGY

The present disclosure relates to queuing of a message before transmission from a mobile communication device and, more particularly, to associating a lifespan with a message.

BACKGROUND

A mobile communication device typically maintains a queue of outbound data to be sent to a destination. The data stored in the queue may, for instance, be messages destined for a server. Such messages may include messages that are formed as requests for information from the server and messages that are formed as updates to information previously stored on the server. Broadly, the messages may be considered elements of a data transaction between the server and the mobile device. Typically, the queue is used only in a transient manner while the mobile device is in coverage range. The queue is of particular use when the mobile device is not in communication with the server. That is, when the mobile device is not within a coverage range of any suitable wireless communications base stations. Typically, after being out of coverage range, when the mobile device enters a coverage range, the mobile device automatically sends the queued messages to the server.

Unfortunately, queuing may be required for extended periods. For instance, the mobile device may be out of coverage for the extent of a long journey aboard an airplane. By the time a given queued message is sent, the given queued message may be out of date.

DETAILED DESCRIPTION

Figure 1:
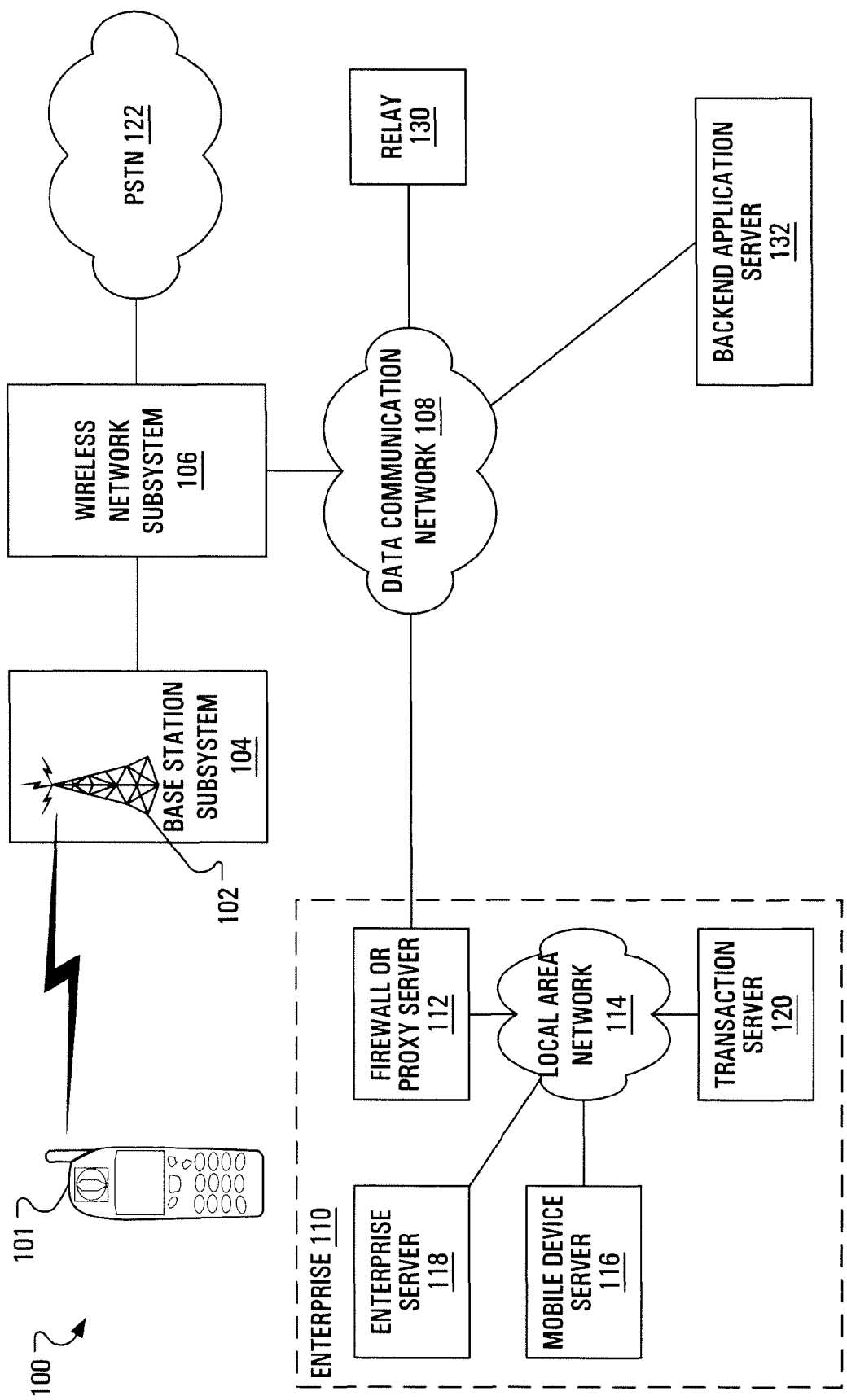
FIG. 1 illustrates elements of an exemplary network environment for a wireless mobile communication device.

An outgoing message may be generated, at a mobile communication device, based on a portion of a received application definition document, which indicates a lifespan for the message. In conjunction with generating a message in accordance with a format provided in the application definition document, a message expiry time may be generated. The message may be stored in a queue for transmission. Additionally, an indication of the expiry time may stored in the queue in association with the message. The expiry time of the message may be periodically compared to the current time to determine whether the message has expired. At the point at which the message is determined to have expired, a user of the mobile communication device may be presented with the option to cancel transmission of the message or re-attempt transmission.

In accordance with an aspect of the present disclosure there is provided a method of handling outgoing messages at a mobile communication device, the method comprising: at the mobile communication device: receiving a document defining a format for messages; generating, according to the format, a message to be transmitted; generating an indication of an expiry time for the message based on information provided in the document; storing the message in a queue of outbound messages; storing the indication of the expiry time in the queue in association with the message; determining that the message remains in the queue after the expiry time; and responsive to the determining: presenting, to a user of the mobile communication device, an indication of a failure to transmit the message before the expiry time; further presenting, to the user of the mobile communication device, a plurality of choices as to future handling of the message; and based on a selection by the user of one of the plurality of choices, removing the message from the queue.

In another aspect of the present disclosure there is provided a mobile communication device comprising: a persistent memory storing a relational database; a communication subsystem; a display; and a processor that, upon execution of computer-executable instructions, causes the device to: receive, via the communication subsystem, a document defining a format for messages; generate, according to the format, a message to be transmitted; generate an indication of an expiry time for the message based on information provided in the document; store the message in a queue table in the relational database; store the indication of the expiry time in the queue table in association with the message; determine that the message remains in the queue table after the expiry time; and responsive to the determining: present on the display an indication of failure to transmit the message before the expiry time; further present on the display a plurality of choices as to future handling of the message; and based on a user selection of one of the plurality of choices, remove the message from the queue.

In yet another aspect of the present disclosure there is provided a computer readable medium containing computer-executable instructions that, when performed by a processor in a mobile communication device, cause the processor to: receive a document defining a format for messages; generate, according to the format, a message to be transmitted; generate an indication of an expiry time for the message based on information provided in the document; store the message in a queue of outbound messages; store the indication of the expiry time in the queue in association with the message; determine that the message remains in the queue after the expiry time; and responsive to the determining: present, to a user of the mobile communication device, an indication of failure to transmit the message before the expiry time; further present, to the user of the mobile communication device, a plurality of choices as to future handling of the message; and based on a selection by the user of one of the plurality of choices, remove the message from the queue.

Other aspects and features of the present disclosure will become apparent to those of ordinary skill in the art upon review of the following description of specific embodiments of the application in conjunction with the accompanying figures.

FIG. 1 illustrates elements of an exemplary network environment 100 for a wireless mobile communication device 101. The elements of the exemplary network environment 100 include a wireless carrier core network subsystem 106 and a data communication network 108, which may be considered to represent at least one wide area network, such as the present day Internet and successors, as well as, potentially, multiple local area networks. A base station antenna 102, with which the mobile device 101 may communicate wirelessly, is provided as part of a base station subsystem 104.

The base station subsystem 104 communicates with the wireless core network subsystem 106. In an exemplary Global System for Mobile communications (GSM) implementation, the wireless core network subsystem 106 includes, among other components, a mobile services switching center, a home location register, a visitor location register and a Short Messaging Service Center. As illustrated in FIG. 1, the wireless core network subsystem 106 may be connected to the data communication network 108 and to a Public Switched Telephone Network (PSTN) 122.

The mobile device 101 may be associated with an enterprise 110 that is in communication with the data communication network 108. The enterprise 110 may, for instance, include a firewall or proxy server 112 connecting to the data communication network 108 and to a local area network (LAN) 114. The LAN 114 may allow communication between a mobile device server 116, an enterprise server 118 and a transaction server 120 within the enterprise.

Also connected to the data communication network 108 may be a relay 130 and a backend application server 132.

Figure 2:
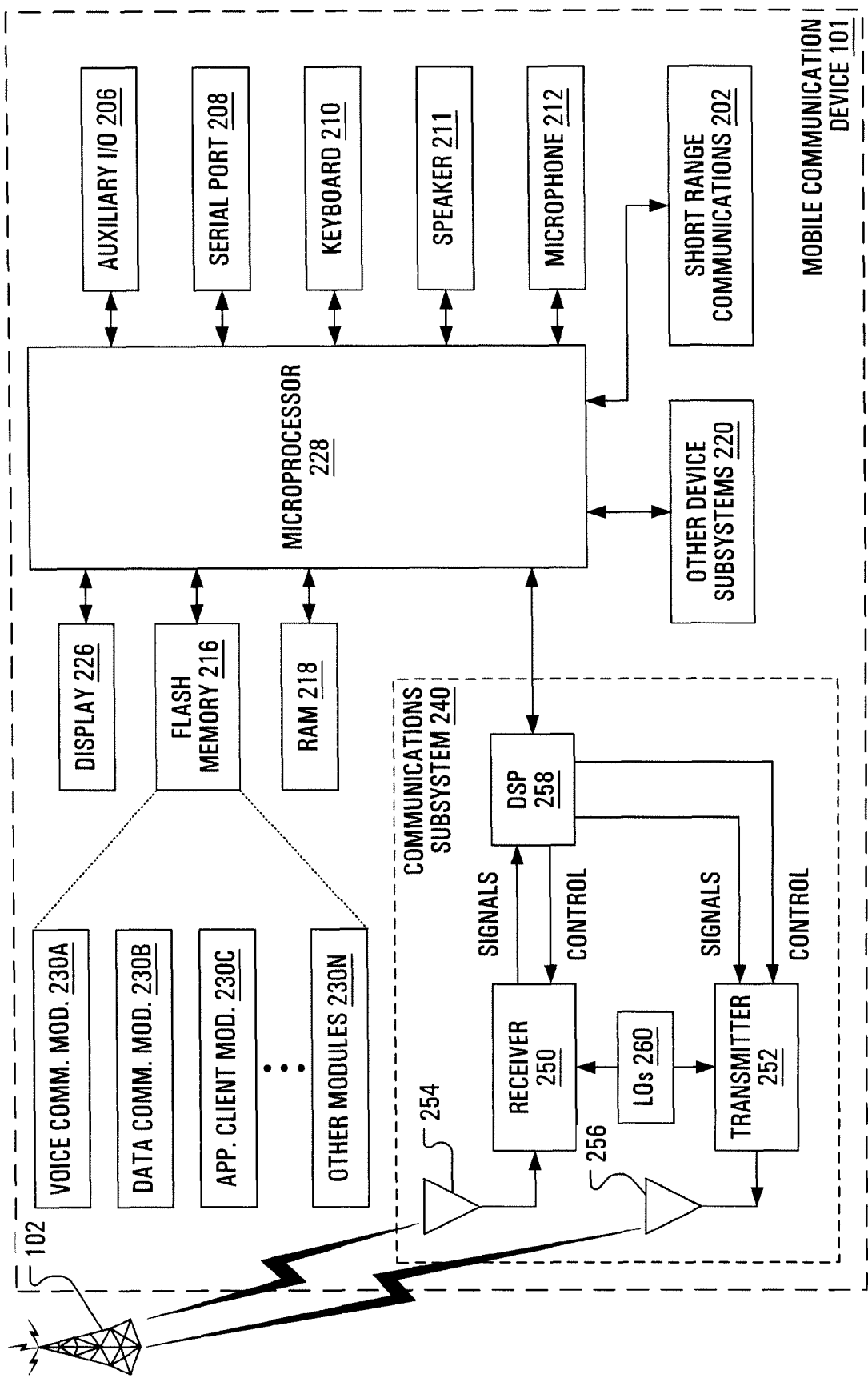
FIG. 2 illustrates, in greater detail, the wireless mobile communication device of FIG. 1 according to an embodiment of the present disclosure.

FIG. 2 illustrates the wireless mobile device 101 including a housing, an input device (a keyboard 210), and an output device (a display 226), which is preferably a full graphic or full color Liquid Crystal Display (LCD). Other types of output devices may alternatively be utilized. A processing device (a microprocessor 228) is shown schematically in FIG. 2 as coupled between the keyboard 210 and the display 226. The microprocessor 228 controls the operation of the display 226, as well as the overall operation of the mobile device 101, in response to actuation of keys on the keyboard 210 by a user.

The housing may be elongated vertically, or may take on other sizes and shapes (including clamshell housing structures). The keyboard 210 may include a mode selection key, or other hardware or software, for switching between text entry and telephony entry.

In addition to the microprocessor 228, other parts of the mobile device 101 are shown schematically in FIG. 2. These include: a communications subsystem 240; a short-range communications subsystem 202; the keyboard 210 and the display 226, along with other input/output devices including a set of auxiliary I/O devices 206, a serial port 208, a speaker 211 and a microphone 212; as well as memory devices including a persistent flash memory 216 and a Random Access Memory (RAM) 218; and various other device subsystems 220. The mobile device 101 is preferably a two-way radio frequency (RF) communication device having voice and data communication capabilities. In addition, the mobile device 101 preferably has the capability to communicate with other computer systems via the Internet.

Operating system software executed by the microprocessor 228 is preferably stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device 101 may also be stored to the RAM 218.

The microprocessor 228, in addition to its operating system functions, enables execution of software applications on the mobile device 101. A predetermined set of software applications that control basic device operations, such as a voice communications module 230A and a data communications module 230B, may be installed on the mobile device 101 during manufacture. An application client subsystem module 230C may also be installed on the mobile device 101 during manufacture, to implement aspects of the application. In particular, the application client subsystem module 230C may include virtual machine software.

Additional software modules, illustrated as an other software module 230N, which may be, for instance, a personal information manager (PIM) application, may be installed during manufacture. The PIM application is preferably capable of organizing and managing data items, such as e-mail messages, calendar events, voice mail messages, appointments, and task items. The PIM application is also preferably capable of sending and receiving data items via a wireless carrier network represented in FIG. 2 by the base station antenna 102. Preferably, the data items managed by the PIM application are seamlessly integrated, synchronized and updated via the wireless carrier network with the mobile device 101 user's corresponding data items stored at, or associated with, the enterprise server 118.

Communication functions, including data and voice communications, may be performed through the communication subsystem 240 and, possibly, through the short-range communications subsystem 202. The communication subsystem 240 includes a receiver 250, a transmitter 252 and one or more antennas, illustrated as a receive antenna 254 and a transmit antenna 256. In addition, the communication subsystem 240 also includes a processing module, such as a digital signal processor (DSP) 258, and local oscillators (LOs) 260. The specific design and implementation of the communication subsystem 240 is dependent upon the communication network in which the mobile device 101 is intended to operate. For example, the communication subsystem 240 of the mobile device 101 may be designed to operate with the Mobitex™, DataTAC™ or General Packet Radio Service (GPRS) mobile data communication networks and may also be designed to operate with any of a variety of voice communication networks, such as Advanced Mobile Phone Service (AMPS), Time Division Multiple Access (TDMA), Code Division Multiple Access (CDMA), Personal Communications Service (PCS), GSM, etc. Other types of data and voice networks, both separate and integrated, may also be utilized with the mobile device 101.

When the required network registration or activation procedures have been completed, the mobile device 101 may send and receive communication signals over the wireless carrier network. Signals received from the base station antenna 102 by the receive antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communication functions, such as demodulation and decoding. In a similar manner, signals to be transmitted to the base station antenna 102 are processed (e.g., modulated and encoded) by the DSP 258 and are then provided to the transmitter 252 for digital to analog conversion, frequency up conversion, filtering, amplification and transmission to the base station antenna 102 via the transmit antenna 256.

In addition to processing communication signals, the DSP 258 provides for control of the receiver 250 and the transmitter 252. For example, gains applied to communication signals in the receiver 250 and the transmitter 252 may be adaptively controlled through automatic gain control algorithms implemented in the DSP 258.

In a data communication mode, a received signal, such as an SMS message or web page download, is processed by the communication subsystem 240 and is input to the microprocessor 228. The received signal is then further processed by the microprocessor 228 in preparation for output to the display 226 or, alternatively, to some of the auxiliary I/O devices 206. A device user may also compose data items, such as e-mail messages or SMS messages, using the keyboard 210 and/or some other auxiliary I/O device 206, such as a touchpad, a rocker switch, a thumb-wheel, or some other type of input device. The composed data items may then be transmitted to the base station antenna 102 via the communication subsystem 240.

In a voice communication mode, overall operation of the mobile device 101 is substantially similar to the data communication mode, except that received signals may be output to the speaker 211, and signals for transmission may be generated by the microphone 212. Alternative voice or audio I/O subsystems, such as a voice message recording subsystem, may also be implemented on the mobile device 101. In addition, the display 226 may also be utilized in voice communication mode, for example, to display the identity of a calling party, the duration of a voice call, or other voice call related information.

The short-range communications subsystem 202 enables communication between the mobile device 101 and other proximate systems or devices, which need not necessarily be similar devices. For example, the short-range communications subsystem 202 may include an infrared device and associated circuits and components, or a Bluetooth™ communication module, to provide for communication with similarly enabled systems and devices.

Figure 3:
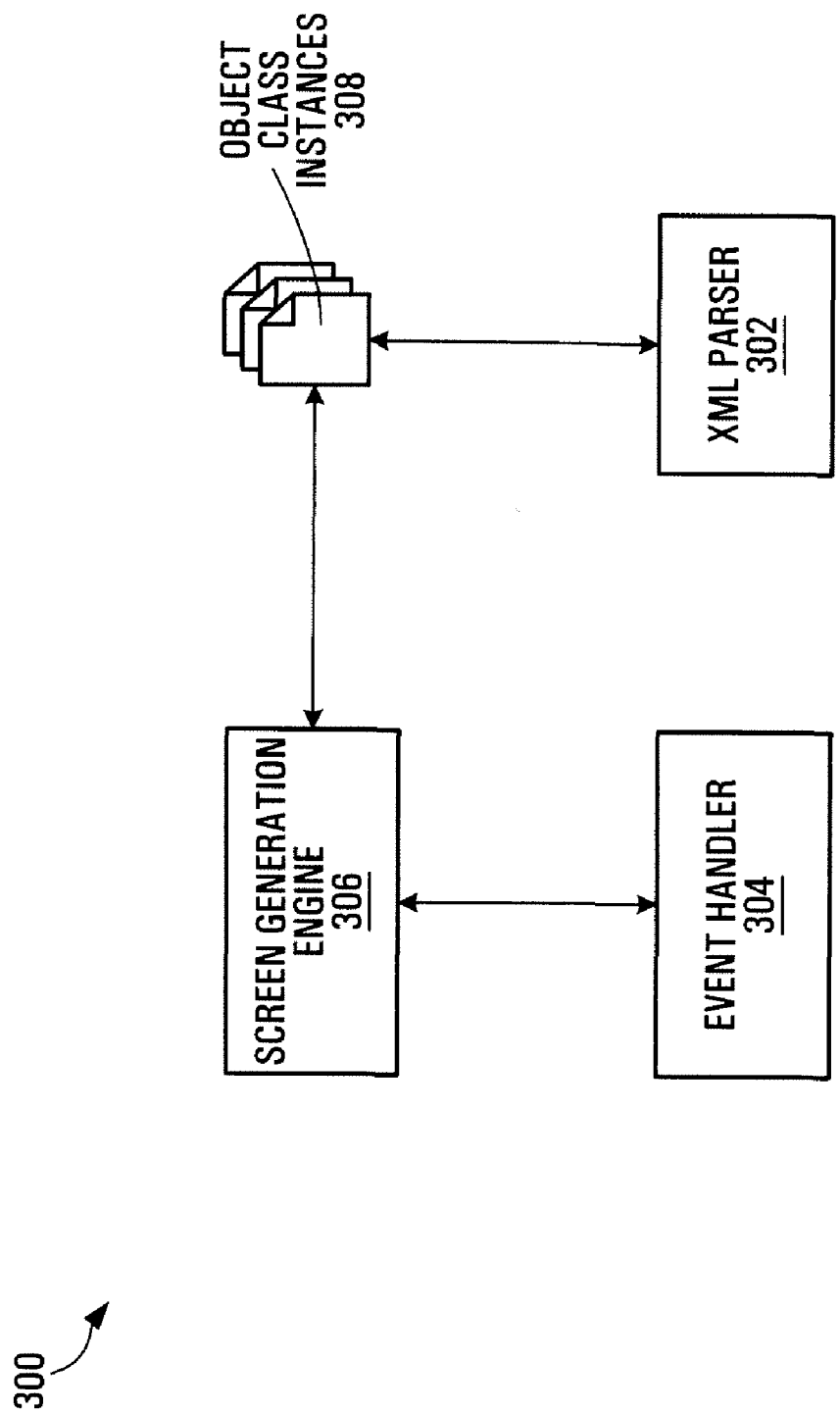
FIG. 3 illustrates elements of a virtual machine according to an embodiment of the present disclosure.

The virtual machine software of the application client subsystem module 230C may include: conventional Extensible Markup Language (XML) parser software; event handler software; screen generation engine software; and object classes. The software, when executed, leads to a virtual machine 300, which, as illustrated in FIG. 3, includes: an XML parser 302; an event handler 304; a screen generation engine 306; and instances 308 of the object classes. The object class instances 308 correspond to XML elements supported by the virtual machine software and possibly other XML elements contained within an application definition document. Supported XML elements are detailed in Appendix A hereto attached. A person of ordinary skill will readily appreciate that those XML elements identified in Appendix A are exemplary only and may be extended or modified as desired.

From the perspective of the mobile device 101, the transaction server 120 is positioned behind the firewall 112. In operation, the transaction server 120 may exchange data traffic with the enterprise server 118. Additionally, the transaction server 120 may exchange data traffic with the backend application server 132. In an exemplary case, the virtual machine 300, executing on the microprocessor 228 of the mobile device 101, generates a request message and stores the request message in a queue of outbound messages. A message transmission object then transmits the request message to the transaction server 120, via the base station subsystem 104, the wireless network subsystem 106, the data communication network 108, the firewall 112 and the local area network 114. Responsive to receiving the request message, the transaction server 120 may execute a database query on a database. The response to the database query may, for instance, be an indication of server-side applications that are available to the mobile device 101. Data representative of the indication may then be transmitted, by the transaction server 120 in a response message, to the mobile device 101.

Upon receipt of the response message at the mobile device 101, the screen generation engine 306 of the virtual machine 300 may present a list of available server-side applications in a user interface on the display 226 of the mobile device 101. In response to being presented with the list of available server-side applications, a user at the mobile device 101 may select a given server-side application for which to register. Responsive to the user selecting the given server-side application, the virtual machine 300 generates a registration request message containing a registration request for the given server-side application and stores the registration request message in the outbound message queue. The message transmission object then transmits the registration request message to the transaction server 120. The transaction server 120, in response to receiving the registration request message, queries the server database for a user interface definition associated with the given server-side application and the mobile device 101. Thereafter, the transaction server 120 creates an application definition document, which includes the user interface definition, and transmits a message that includes the application definition document to the mobile device 101.

Figure 4:
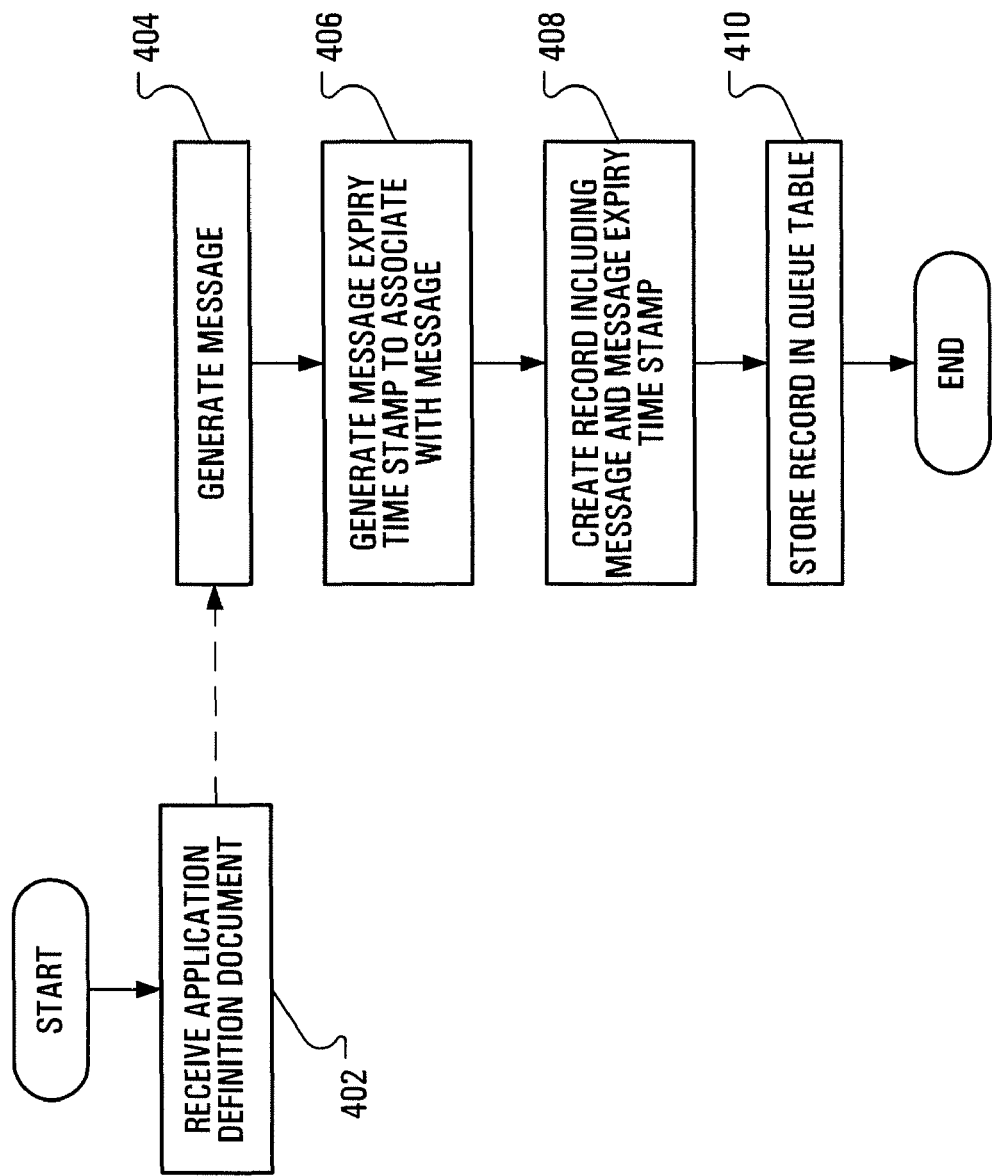
FIG. 4 illustrates steps of an exemplary method of generating a message with a limited lifespan according to an embodiment of the present disclosure.

At the mobile device 101, the application definition document carrying message is received (step 402, FIG. 4). After receiving the application definition document carrying message, the XML parser 302 of the virtual machine 300 may parse the text of the application definition document and the screen generation engine 306 may generate, according to the user interface definition, a user interface for presentation on the display 226 of the mobile device 101. Some time after receipt of the application definition document and using the user interface, a user could trigger the transmission, by the mobile device 101, of a login request to transaction server 120. The login request is received by the transaction server 120 and subsequently transmitted to the server hosting the given server-side application (e.g., the enterprise server 118 or the backend application server 132). The server hosting the given server-side application, according to the logic embedded within the given server-side application, returns a login response to the transaction server 120, which login response the transaction server 120 transmits to the mobile device 101. Subsequent traffic related to the given server-side application, for instance, messages to be transmitted from the mobile device 101 to the server hosting the given server-side application, also flows through the transaction server 120.

As may be understood from the preceding, the transaction server 120 may be considered to manage the flow of data between an application executed at a server and an interface to that application presented at the mobile device 101. Among other operating systems, the transaction server 120 may be implemented on Microsoft™ Windows 2000 or Windows 2003 server. The collection of functions executed at the transaction server 120 may be considered to include application management, access control, event monitoring, session control, transaction queuing, data routing, user management and network connectivity monitoring.

In overview, the application client subsystem module 230C may provide instructions to allow the microprocessor 228 to generate a message for transmission to the transaction server 120 (FIG. 1). In conjunction with storing the generated message in the outbound message queue, the microprocessor 228 may also store a message expiry time stamp, i.e., an indication of an expiry time. If the time represented by the message expiry time stamp occurs before the message is transmitted from the outbound message queue, an event callback may be arranged to occur.

As is known in the art, the outbound message queue may be implemented as a "queue table" in a relational database, say, in the persistent flash memory 216. Relational databases may be structured to include tables, which contain records. As such, an outbound message may be stored in a Message field of a message record in the queue table. Advantageously, a new field, a "Message Expiry Time Stamp" field, may be defined for the message record, where the Message Expiry Time Stamp field is arranged for storage of a time stamp to be associated with the message stored in the Message field of the message record.

Advantageously, due to the persistence of the flash memory 216 in which the queue table is stored, the mobile device 101 may be powered off and yet maintain the messages in the outbound queue for transmission when the device is powered on. Persistent memory is a common feature of mobile communication devices. For example, PocketPC devices provide persistent memory, control of which is provided through a Microsoft™ application called "Pocket Access". Palm™ devices have persistent memory in the form of a built-in data store.

Message expiry is generally known in other message-handling protocols to occur at a location away from the source of the message. For instance, it is known to insert a Time-To-Live (TTL) value in an Internet Protocol (IP) packet to indicate to a IP network router whether a given IP packet has been handled by a predetermined number of IP routers. If the predetermined number is exceeded, the given IP packet may be discarded and a message may be sent to the source of the given IP packet. The TTL is not, in fact, a time. Instead, the TTL is a count. The count is initialized to the predetermined number of IP routers by the source of the given IP packet. Each router that receives the given IP packet and transmits the given IP packet also decrements the count by one. When the count reaches zero, the predetermined number is considered to have been exceeded.

Message expiry is also known in the Push Access Protocol (PAP) for the Wireless Application Protocol (WAP), as described in "Push Access Protocol", version 29 Apr. 2001, Wireless Application Protocol, WAP-247-PAP-20010429-a, available from www.wapforum.org. A push initiator may generate a message for a mobile client. The push initiator may include a field in the message that specifies a precise date and time at which the message should be considered to have expired. A push proxy gateway that receives the message for transmission to the mobile client may successfully transmit the message to the mobile client, may receive a confirmation from the mobile client and, responsive to receiving the confirmation, transmit a delivery confirmation to the push initiator. Where the precise date and time specified in the message passes without the message having been transmitted to the mobile client, the push proxy gateway may transmit an expiry notification to the push initiator.

In contrast to the above-mentioned protocols, which may be seen to implement message expiry rules in a location remote from the source of the message, it is proposed herein to implement message expiry rules directly at the source of the message. Advantageously, it is the source of the message that can best determine a time period such that the relevance of the message, after the expiry of the time period, has been reduced to the point that the message is preferably not sent.

As discussed above, an application definition document provides a user interface definition. Overall, the application definition document may define for a particular server-side application: a user interface for controlling application functionality and display format (including display flow); the format of data to be exchanged over the data communications network 108; and the format of data to be stored locally at the mobile device 101. The virtual machine may use the operating system software, also executed by the microprocessor 228, and associated application programming interfaces (APIs) to interact with elements of the mobile device 101 in accordance with the received application definition document. In this way, the mobile device 101 may present interfaces for a variety of applications executed at a variety of remote application servers.

While creating an application definition document, a developer may have an opportunity to define a number of types of messages to be sent by the mobile device 101 to the transaction server 120 (some of which may be destined for the backend application server 132 or the enterprise server 118). To implement aspects of the present disclosure at design time, a developer may specify, for a specific type of message, a lifespan.

As presented in the previously cited US Patent Application Publication 2003/0060896, an exemplary application definition document may be formed using a markup language, such as the known XML or a variant thereof. In accordance with an embodiment of the present disclosure, defined XML elements are interpreted by the virtual machine 300 and may be used as building blocks to present, at the mobile device 101, an interface to server-side applications.

Instances 308 of object classes allow the mobile device 101 to process each XML element of a set of supported XML elements. Each of the object classes may be defined to include, for each supported XML element: attributes, which may be used to store parameters defined by the application definition document; and functions, which allow the XML element to be processed at the mobile device 101. As such, the developer may specify a lifespan as an attribute of a XML element in an application definition document.

Appendix B provides an exemplary application definition document whose format should be familiar to those skilled in the art of developing markup language documents. At line 39, a definition of a screen named "GETQUOTE" begins. As part of the screen definition and, further, as part of a definition of a MENU element beginning at line 44 for a menu with a NAME attribute of "mnuMainMenu", a MENUITEM element with NAME attribute "GetQuote" is defined beginning at line 45. The MENUITEM element with NAME attribute "GetQuote" includes an EVENT element with a TYPE attribute "MENUITEMSELECTED". The EVENT element with a TYPE attribute "MENUITEMSELECTED" is associated with three ACTION elements, having TYPE attributes of: "OPEN"; "SAVE"; and "ARML". The ACTION element of the type "ARML" (see line 52) includes an attribute "TTL" whose value is provided as "5".

The TTL attribute may be considered a lifespan attribute. The value given to the TTL attribute may be considered to be representative of a number of "Ticks." For a given virtual machine, a tick may be defined as representative of, for example, a millisecond, a second or a minute.

The format provided by the exemplary application definition document of Appendix B also includes some variable fields that are to be filled dynamically based on placeholders in the variable fields. Such dynamic filling may, for instance, be based upon data provided by the user in response to a screen presented on the display of the mobile device 101. The variable fields are delimited by square brackets, i.e., "[" and "]". These placeholders reference a data source from which data for filling the variable field should be obtained. A suitable data source might be a user interface field on a current screen, a user interface field on a previous screen or a table in a device-based logical database. The virtual machine 300, after reading the data source name, searches for the field corresponding to the referenced data source and replaces the placeholder with data contained within the named field.

In operation, the virtual machine executed on the microprocessor 228 may control the presentation, on the display 226 of the mobile device 101, of a screen named "GETQUOTE" according to the exemplary application definition document of Appendix B. The user of the mobile device 101 may select the GetQuote menu item such that an event of the type "MENUITEMSELECTED" is detected by the operating system of the mobile device 101. The operating system may indicate the detected event to the event handler 304 of the virtual machine 300. The event handler 304 may, based on the definition of the MENUITEM element in the application definition document, arrange for the performance of three actions, each of the three actions defined by a distinct ACTION element, by the virtual machine 300.

According to the ACTION element of type ARML, the event handler 304 instantiates an object from an object class of the virtual machine software, where the object class corresponds to the ACTION element of type ARML. The instantiated object then calls a message generation method to generate a message (step 404, FIG. 4) for transmission to the transaction server 120.

The exemplary application definition document of Appendix B includes a format at lines 54-56, according to which format the message generation method may generate the message. The message format provided by the exemplary application definition document of Appendix B is delimited by <PKG></PKG> tags. The <PKG> tag has an attribute named "TYPE". Wrapped by the <PKG></PKG> tags, the message payload is a <SYMBOL></SYMBOL> tag pair. The SYMBOL element defined by the tag pair has an attribute named "E". The attribute E of the SYMBOL element references a placeholder, as does the content of the SYMBOL element itself.

The message generation method may, based on the provided format, add text to a string variable. As mentioned above, elements of the application definition document, including elements of the action, have been parsed by the XML parser 302. The message generation method adds successive portions of the message to the string variable, such as "<PKG TYPE="QR">", then "<SYMBOL", then E="". Before adding the next portion, the message generation method resolves the placeholder "[GETQUOTE.chExch]" and adds the text to which the placeholder resolves to the string variable. The message generation method then adds more portions of the message to the string variable, such as """>". Before adding the next portion, the message generation method resolves the placeholder "[GETQUOTE.edtSymbol]" and adds the text to which the placeholder resolves to the string variable. The message generation method may finish the message by adding "</SYMBOL></PKG>" to the string variable.

The GETQUOTE screen includes an edit box (EB) element with a NAME attribute "edtSymbol" and further attributes including SAVE="YES" and SAVENAME="edtSymbol". The GETQUOTE screen also includes a CHOICE element with a NAME attribute "chExchange" and further attributes including SAVE="YES" and SAVENAME="chExch".

Above the ACTION element of TYPE "ARML" there is an ACTION element of TYPE "SAVE". When the virtual machine 300 executes the ACTION element of TYPE "SAVE", the virtual machine 300 saves the contents of the edtSymbol EB element and the chExchange CHOICE element into the variables defined in the SAVENAME attributes of the edtSymbol EB element and the chExchange CHOICE element, respectively, because the SAVE attributes of the edtSymbol EB element and the chExchange CHOICE element are set to TRUE. The virtual machine 300 stores the variables locally in association with the screen GetQuote so that the variables may be accessed by using [GETQUOTE.edtSymbol] and [GETQUOTE.chExch] as the syntax to retrieve these values.

In an exemplary resolution of a placeholder, the message generation method, after reading the data source name, searches for the variable and replaces the placeholder with value of the variable. For example, the user may have selected the choice "TSE" on the GETQUOTE screen. Similarly, the user may have inserted the text "RIMM" in the edtSymbol edit box on the GETQUOTE screen. Upon executing the ACTION element of TYPE "SAVE", virtual machine 300 assigns the value TSE to the variable chExch, assigns the value RIMM to the variable edtSymbol and stores the variables. Upon executing the ACTION element of TYPE "ARML", the message generation method may, while generating a message according to the provided message format, determine the value of the variable chExch and insert the text TSE in place of the [GETQUOTE.chExch] placeholder and determine the value of the variable edtSymbol and insert the text RIMM in place of the [GETQUOTE.edtSymbol] placeholder.

An exemplary message generated according to message format provided in the exemplary application definition document of Appendix B may appear as follows:

<PKG TYPE="QR"><SYMBOL E="TSE">RIMM</SYMBOL></PKG>

When the string variable contains the entire message, that is, the message generation method has added the text "</PKG>" to the string variable, the virtual machine 300 may then call a message expiry time stamp generation method to generate (step 406, FIG. 4) a message expiry time stamp. The message expiry time stamp may be generated by determining the current time and adding a time span based on the value of the TTL attribute to the current time. For example, where the value of the TTL attribute of the ARML action element is 5 and a "tick" is considered to be a minute, the message expiry time stamp may be generated by adding five minutes to the current time.

The virtual machine 300 may then call a message record creation method to create (step 408) a message record. The message record may include the generated message and the message expiry time stamp, among other data. The other data may, for instance, include an time stamp representative of the time of creation of the message record and an indication of the value of the TTL attribute. The virtual machine 300 may then call a message record storage method to store (step 410) the message record in the queue table.

Concurrently, a message transmission object may be arranging the transmission of the message portion of the oldest message record in the queue table to the transaction server 120. The message transmission object may, for instance, determine which message record is the oldest in the queue table by considering a "time added" time stamp stored in each message record in the queue table. As such, the queue table may be considered to act as a First-In-First-Out (FIFO) queue in that the message transmission object attempts to transmit the message at the top of the queue, i.e., the message portion of the oldest message record, first.

Where the transmission of the message is successful, the message transmission object deletes the message record from the queue table and arranges the transmission of the message portion of the oldest message record in the queue table given that the former oldest message record has been deleted from the queue table.

Where the transmission of the message is unsuccessful, the message transmission object may delay re-attempting transmission of the message portion of the oldest message record in the queue table for a predetermined waiting time. Additionally, the message transmission object may store the time of the last attempt to transmit the message in a Last Attempt Time field associated with the Message field. The message transmission object may also read a value from a Transmission Attempt Number field associated with the Message field, increment the value by one and store the incremented value in the Transmission Attempt Number field.

Rather than delaying re-attempting transmission for a predetermined waiting time, the message transmission object may wait for a signal from the operating system of the mobile device 101, where the signal indicates that communications to the network have been re-established.

Figure 5:
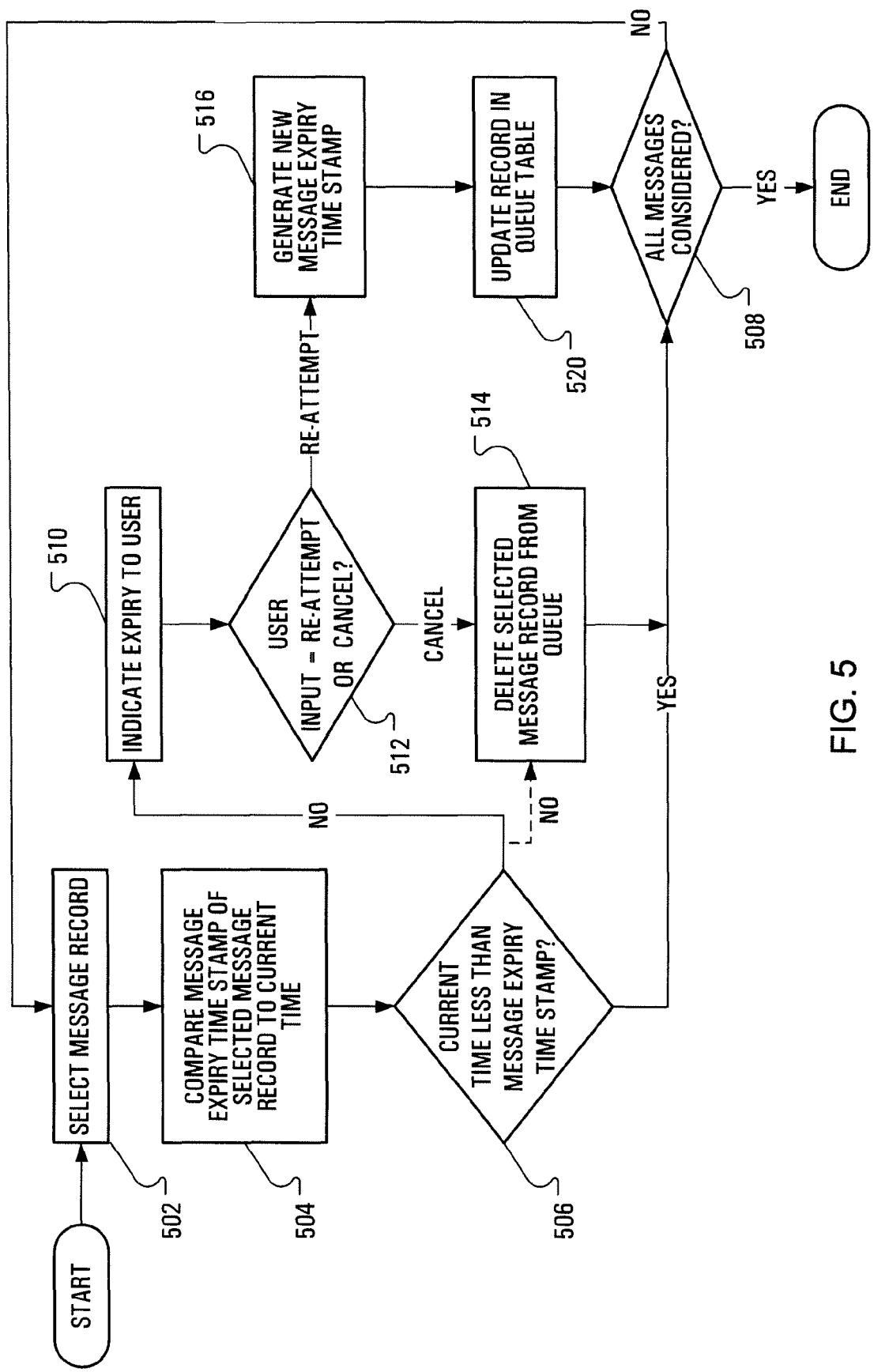
FIG. 5 illustrates steps of an exemplary message expiry queue management method according to an embodiment of the present disclosure.

According to a message expiry queue management method, exemplary steps of which are illustrated in FIG. 5, a queue management object may select (step 502) a message record for considering message expiry. The queue management object may then compare (step 504) the time stored in the Message Expiry Time Stamp field of the selected message record to the current time. Where the current time is determined (step 506) to be less than the time stored in the Message Expiry Time Stamp field of the selected message record, the queue management object may determine (step 508) whether there are message records in the queue table that have not yet been considered. If all message records have been considered, the method of FIG. 5 is complete. If not all message records have been considered, the queue management object may select (step 502) another message record for considering message expiry, and the method of FIG. 5 repeats.

Where the current time is determined (step 506) to be greater than the time stored in the Message Expiry Time Stamp field of the selected message record, the queue management object may pass an indication of the message expiry to the event handler 304 so that an event callback (step 510) may be arranged to indicate, to the user, the expiry of the lifespan of the message record. As will be apparent to a person of ordinary skill, in an exemplary event callback, the screen generation engine 306 may arrange for the presentation, on the display 226 of the mobile device 101, of a dialog that indicates, "The lifespan of this message has expired. Do you wish to re-attempt transmission of the message or cancel transmission?".

Responsive to determining (step 512) that the user has indicated that transmission of the message portion of the selected message record should be cancelled, the event handler 304 may trigger execution of a message record deletion method to delete (step 514) the selected message record from the queue table.

Where the mobile device 101 is a PocketPC, the relational database of which the queue table is a part may be managed by the known Pocket Access application. Deletion of a message record, as required by step 510, may be accomplished using a "DELETE FROM TBLOUTBOUNDQUEUE" statement supplying the primary key of the message record. A similar mechanism may be used for the deletion of a message record in a queue table managed by a database application executed on a Palm™ operating system.

After deleting the selected message record, the queue management object may determine (step 508) whether there are message records in the queue table that have not yet been considered. If all message records have been considered, the method of FIG. 5 is complete. If not all message records have been considered, the queue management object may select (step 502) another message record for considering message expiry, and the method of FIG. 5 repeats.

Responsive to determining (step 512) that the user has indicated that transmission of the message portion of the selected message record should be re-attempted, the event handler 304 may trigger the virtual machine 300 to call the message generation method to generate (step 516) a new message expiry time stamp. The new message expiry time stamp may be generated by determining the current time and adding, to the current time, a time span based on the value of the TTL attribute, stored as part of the message record, to the current time. In the case in which the value of the TTL attribute has not been stored as part of the message record, a time span to add to the current time to generate (step 516) a new message expiry time stamp may be determined, for instance, as a difference between the current time and an indication of the time of creation of the message record.

The virtual machine 300 may then call the message record storage method to update (step 520) the selected message record in the queue table. That is, the message record storage method writes the new message expiry time stamp to the Message Expiry Time Stamp field of the selected message record and, by doing so, replaces the old message expiry time stamp. Advantageously, the rest of the selected message record remains unchanged by the message record storage method.

After updating the selected message record in the queue table, the queue management object may determine (step 508) whether there are message records in the queue table that have not yet been considered. If all message records have been considered, the method of FIG. 5 is complete. If not all message records have been considered, the queue management object may select (step 502) another message record for considering message expiry, and the method of FIG. 5 repeats.

Notably, in an alternative message expiry queue management method, the queue management object may not interact with the user. Instead, where the current time is determined (step 506) to be greater than the time stored in the Message Expiry Time Stamp field of the selected message record, the queue management object may delete (step 514) the selected message record from the queue table. After deleting the selected message record, the queue management object may determine (step 508) whether there are message records in the queue table that have not yet been considered. If all message records have been considered, the method of FIG. 5 is complete. If not all message records have been considered, the queue management object may select (step 502) another message record for considering message expiry, and the method of FIG. 5 repeats.

Advantageously, messages generated according to unique ACTION elements types may be configured to each have a unique lifespan. That is, the unique ACTION elements may have unique TTL attributes. The lifespan may be, for example, based on priority and message content.

Other modifications will be apparent to those skilled in the art and, therefore, the invention is defined in the claims.

We claim:

1. A method of handling outgoing messages at a mobile communication device, said method comprising:
   at said mobile communication device:
   receiving a document defining a format for messages;
   generating, according to said format, a message to be transmitted;
   generating an indication of an expiry time for said message based on information provided in said document;
   storing said message in a queue of outbound messages;
   storing said indication of said expiry time in said queue in association with said message;
   determining that said message remains in said queue after said expiry time; and
   responsive to said determining:
   presenting, to a user of said mobile communication device, an indication of a failure to transmit said message before said expiry time;
   further presenting, to said user of said mobile communication device, a plurality of choices as to future handling of said message; and
   based on a selection by said user of one of said plurality of choices, removing said message from said queue.

2. The method of claim 1 wherein said queue is a table in a relational database and said storing said message and said indication of said expiry time in said queue comprises:
   creating a message record that includes said message and said indication of said expiry time; and
   storing said message record in said table.

3. The method of claim 1 wherein said document defining said format for messages comprises a markup language document.

4. The method of claim 1 wherein said format for messages is provided as part of an element of said document.

5. The method of claim 4 wherein said information provided in said document comprises a value of an attribute of said element.

6. The method of claim 5 wherein said generating said indication of said expiry time for said message comprises:
   determining a current time;
   generating a duration based on said value of said attribute of said element; and
   generating said expiry time as a sum of said duration and said current time.

7. A mobile communication device comprising:
   a persistent memory storing a relational database;
   a communication subsystem;
   a display; and
   a processor that, upon execution of computer-executable instructions, causes said device to:
   receive, via said communication subsystem, a document defining a format for messages;
   generate, according to said format, a message to be transmitted;
   generate an indication of an expiry time for said message based on information provided in said document;
   store said message in a queue table in said relational database;
   store said indication of said expiry time in said queue table in association with said message;
   determine that said message remains in said queue table after said expiry time; and
   responsive to said determining:
   present on said display an indication of failure to transmit said message before said expiry time;
   further present on said display a plurality of choices as to future handling of said message; and
   based on a user selection of one of said plurality of choices, remove said message from said queue.

8. The mobile communication device of claim 7 wherein said storing said message and said indication of said expiry time in said queue table comprises:
   creating a message record that includes said message and said indication of said expiry time; and
   storing said message record in said queue table.

9. The mobile communication device of claim 7 wherein said document defining said format for messages comprises a markup language document.

10. The mobile communication device of claim 7 wherein said format for messages is provided as part of an element of said document.

11. The mobile communication device of claim 10 wherein said information provided in said document comprises a value of a lifespan attribute of said element.

12. The mobile communication device of claim 11 wherein said value of said lifespan attribute is message-specific.

13. The mobile communication device of claim 11 wherein said generating said indication of said expiry time for said message comprises:
    determining a current time;
    generating a duration based on said value of said attribute of said element; and
    generating said expiry time as a sum of said duration and said current time.

14. A computer readable medium containing computer-executable instructions that, when performed by a processor in a mobile communication device, cause said processor to:
    receive a document defining a format for messages;
    generate, according to said format, a message to be transmitted;
    generate an indication of an expiry time for said message based on information provided in said document;
    store said message in a queue of outbound messages;
    store said indication of said expiry time in said queue in association with said message;
    determine that said message remains in said queue after said expiry time; and
    responsive to said determining:
    present, to a user of said mobile communication device, an indication of failure to transmit said message before said expiry time;
    further present, to said user of said mobile communication device, a plurality of choices as to future handling of said message; and
    based on a selection by said user of one of said plurality of choices, remove said message from said queue.

15. The computer readable medium of claim 14 wherein said queue is a table in a relational database and said storing said message and said indication of said expiry time in said queue comprises:
    creating a message record that includes said message and said indication of said expiry time; and
    storing said message record in said table.

16. The computer readable medium of claim 14 wherein said document defining said format for messages comprises a markup language document.

17. The computer readable medium of claim 14 wherein said format for messages is provided as part of an element of said document.

18. The computer readable medium of claim 17 wherein said information provided in said document comprises a value of a lifespan attribute of said element.

19. The mobile communication device of claim 18 wherein said value of said lifespan attribute is message-specific.

20. The computer readable medium of claim 18 wherein said generating said indication of said expiry time for said message comprises:

determining a current time;

generating a duration based on said value of said attribute of said element; and generating said expiry time as a sum of said duration and said current time.

* * * * *